United States Patent [19]

Sahlin

[11] 4,243,078
[45] Jan. 6, 1981

[54] METHOD AND APPARATUS FOR MANUFACTURING FUEL RODS

[75] Inventor: Thorbjörn Sahlin, Vesteras, Sweden

[73] Assignee: ASEA Aktiebolag, Vesteras, Sweden

[21] Appl. No.: 2,895

[22] Filed: Jan. 12, 1979

[30] Foreign Application Priority Data

Jan. 24, 1978 [SE] Sweden .................................. 7800820

[51] Int. Cl.³ .............................................. B65B 1/04
[52] U.S. Cl. ........................................ 141/1; 141/392; 53/244; 53/473; 193/32; 193/40
[58] Field of Search ..................... 141/1, 392; 221/311, 221/157, 163, 171; 53/473, 244, 255; 193/40, 32; 198/459

[56] References Cited

FOREIGN PATENT DOCUMENTS

951677 3/1964 United Kingdom ...................... 193/32

*Primary Examiner*—Houston S. Bell, Jr.
*Attorney, Agent, or Firm*—Watson, Cole, Grindle & Watson

[57] ABSTRACT

A method and an apparatus for manufacturing nuclear fuel rods by introducing elongated fuel pellets into cladding tubes. The pellets are arranged in end-to-end relationship on a support and are pushed axially from the support over a well defined break point and onto a downwardly inclined guide. The guide is disposed at a sufficient angle to cause the pellets to slide therealong under the influence of gravity. The cladding tube is disposed at the lower end of the guide in alignment therewith and in a position for receiving the sliding pellets.

11 Claims, 3 Drawing Figures

METHOD AND APPARATUS FOR MANUFACTURING FUEL RODS

BACKGROUND OF THE INVENTION

1. Field of the Invention

The present invention relates to a method and an apparatus for manufacturing nuclear fuel rods by introducing elongated fuel pellets into cladding tubes.

2. Description of the Prior Art

The fuel for nuclear reactors generally is in the form of cylindrical sintered uranium pellets. Groups of such pellets are disposed in elongated cladding tubes designed to prevent coolant from making direct contact with the radioactive fuel. This is to prevent the scattering of radioactive material with the coolant. A particular fuel rod may contain up to 500 individual pellets each having a diameter of about 10 millimeters and a length of about 11 millimeters. The cladding tube itself will thus often have a length of up to about 5000 millimeters. In such fuel rods it is desirable to have a very small clearance in the order of a few hundredths of a millimeter between the outer diameter of the pellets and the inner diameter of the tube.

The introduction of the pellets into the cladding tubes has in the past been very difficult and time consuming because of the small clearances involved. Ordinarily strings of pellets have been inserted into horizontally positioned tubes and it has been found that if the end surfaces of the pellets are not absolutely perpendicular to the longitudinal axis of the tube, the string of pellets will become disoriented during insertion whereby the friction between the pellets and the inside surfaces of the tube is increased and a cutting phenomena may even result. Moreover, large insertion forces have often been required in the past due to the high density of the pellets.

SUMMARY OF THE INVENTION

The present invention provides both a method and an apparatus for alleviating the difficulties which have been encountered in the past in the introduction of fuel pellets into cladding tubes during the production of nuclear fuel rods. To this end the method of the invention comprises the providing of a horizontal support means having an edge. A plurality of fuel pellets are arranged in end-to-end relationship along a horizontal axis extending toward the edge on the support. An elongated downwardly inclined guide means is disposed with its upper end in contact with the edge of the support means at the axis whereby the support means and the guide means together present a break point at their junction. The downward inclination of the guide means is sufficient to cause a pellet placed longitudinally thereon to slide therealong under the influence of gravity. The method further involves the positioning of a cladding tube at the lower end of the guide means in longitudinal alignment therewith and in a position for receiving sliding pellets through its open end. The pellets are displaced along the axis and over the break point whereupon each pellet will individually slide down the guide means and into the cladding tube. The displacement is accomplished at a rate such that the pellets are longitudinally spaced from one another as they slide toward and into the cladding tube.

In its more particular aspects, the method of the invention provides for the replacement of each cladding tube with an unfilled cladding tube whenever the first tube becomes properly loaded with a predetermined number of pellets. Moreover, the method contemplates the provision of further arrangements of additional pellets disposed along additional axes positioned in parallelism with respect to the first-mentioned axis and the lateral movement of such further arrangements in seriatim into a position along the first-mentioned axis whenever the pellets of a prior arrangement have been displaced over the break point. The pellets of such further arrangements are then displaced in the same manner as the original pellets.

In another aspect, the present invention involves the provision of an apparatus for manufacturing nuclear fuel rods by introducing elongated fuel pellets into cladding tubes. The apparatus comprises horizontal support means having an edge and means for arranging a plurality of pellets in end-to-end relationship along a horizontal axis extending toward the edge on the support. The apparatus also includes an elongated downwardly inclined guide means disposed with its upper end in contact with the edge of the support means at the axis whereby the support means and the guide means together present a break point at their junction. The downward inclination of the guide means is sufficient to cause a pellet placed longitudinally thereon to slide thereon under the influence of gravity. Also included are means for positioning a cladding tube at the lower end of the guide means, in longitudinal alignment therewith and in a position for receiving sliding pellets through its open end. The apparatus includes means for displacing pellets along the axis and over the break point whereupon each pellet will individually slide down the guide means and into the cladding tube. The displacement means is operative for displacing the pellets at a rate such that the pellets are longitudinally spaced from one another as they slide downwardly toward and into the cladding tube.

In a more specific aspect of the apparatus of the invention, the means for arranging the pellets comprises a plate mounted on the support for movement in a lateral direction. The plate is provided with a plurality of parallel pellet-receiving grooves which extend in a direction parallel to the axis along which the pellets are displaced.

DETAILED DESCRIPTION OF THE INVENTION

Figure 1:
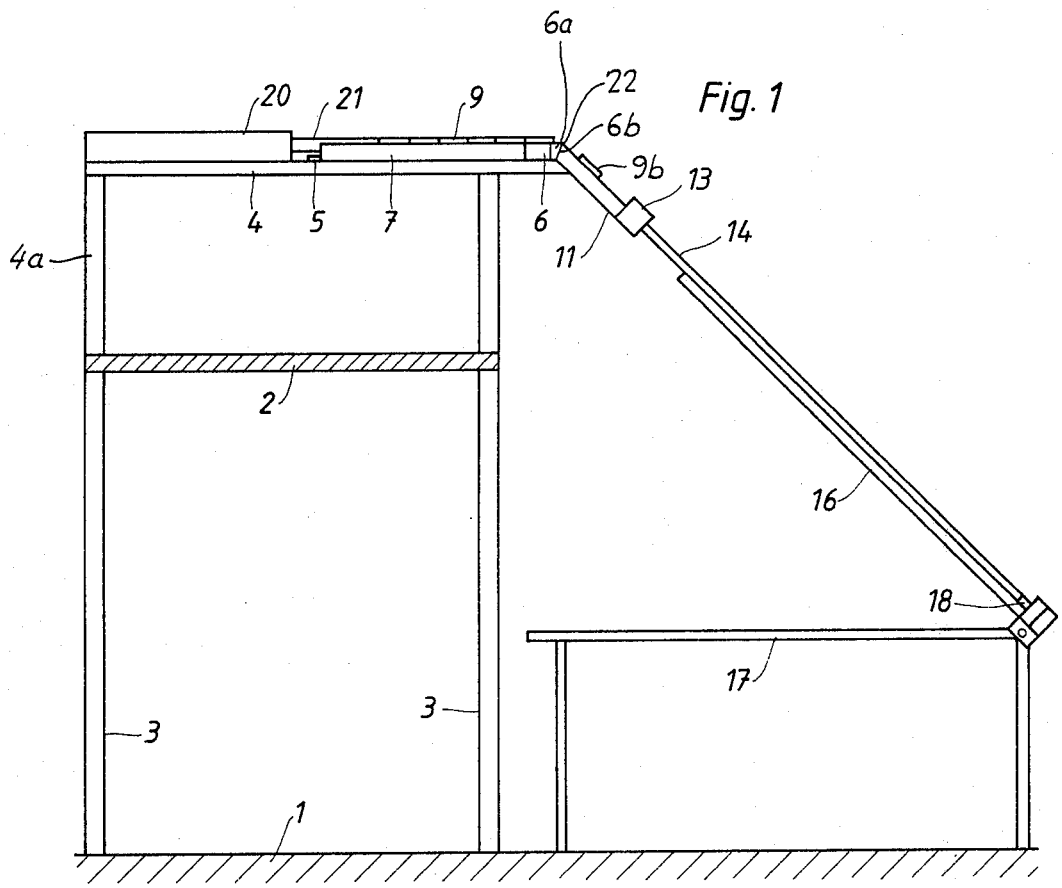
FIG. 1 is a schematic, side elevational view of an apparatus which embodies the principles and concepts of the present invention.

As illustrated in the drawings, the reference numeral 1 designates the floor level of a work room and the reference numeral 2 designates an elevated work plane which is supported by columns 3. A table 4 having legs 4a is mounted on work plane 2. Table 4 includes a pair of spaced parallel guide bars 5 and 6 between which a plate 7 is mounted for sliding movement in a direction parallel to bars 5 and 6 and perpendicular or lateral with respect to the longitudinal axis of table 4. Plate 7 is provided with a plurality of spaced, parallel grooves 8 adapted for receiving strings of pellets 9 as particularly illustrated in FIG. 2. As can be seen, the grooves 8 extend in a direction which is parallel to the major longitudinal axis of table 4.

A horizontal guiding groove 10 is provided in bar 6 and this groove 10 is adapted for receiving pellets from any particular groove 8 aligned therewith. In this regard it is important to note that the plate 7 is laterally slidable on table 4 such that any one of the grooves 8 may be moved into alignment with guiding groove 10.

Figure 2:
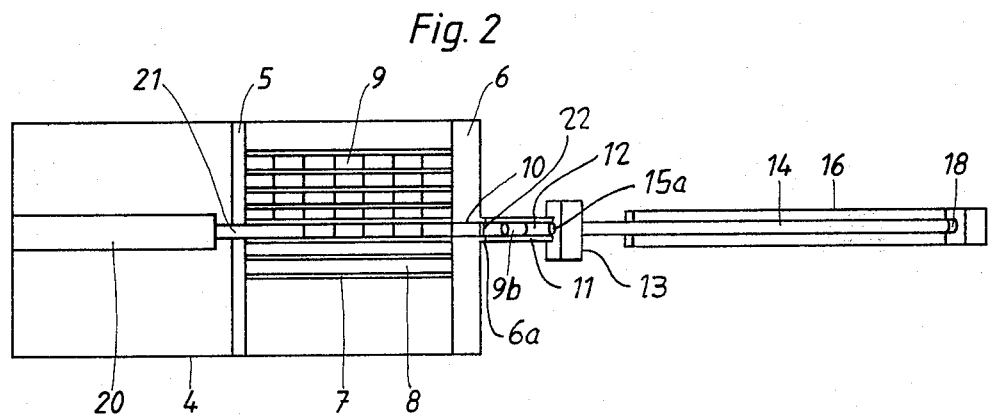
FIG. 2 is a top plan view of the apparatus of FIG. 1.

Bar 6 is provided with a small forward projection 6a, and as can be seen viewing FIG. 2, the groove 10 extends to the forward edge 6b of projection 6a. Thus, table 4 and the bar 6 present horizontal support means having an edge 6b. Moreover, it can be seen that plate 7 provides means for arranging a plurality of pellets 9 in end-to-end relationship along a horizontal axis on table 4 which extends toward edge 6b.

A sloping guiding means 11 having a groove 12 and a connector 13 is connected to projection 6a of bar 6 at edge 6b. As can be seen, groove 12 is disposed in alignment with groove 10 in bar 6. Connector 13 is provided with an opening 15 extending therethrough as can best be seen in FIG. 3. Opening 15 preferably has an upper slightly conical portion 15a, a central cylindrical portion 15b and a lower tube receiving portion 15c, the latter being adapted for receiving the open end 14a of a cladding tube 14. Thus is provided an elongated downwardly inclined guide means 11 which is disposed with its upper end in contact with edge 6b at the axis of groove 10. And it can be seen that projection 6a of bar 6 and guide means 11 together present a well defined break point 22 at their junction.

A supporting member 16 for cladding tube 14 is preferably articulately connected to a table 17 whereby the same may be swung into the position illustrated in FIG. 1 by a lifting device (not illustrated). In practice, a cladding tube 14 may be displaced along member 16 and inserted into guiding portion 15c of connector 13 by means of an operating cylinder including a piston rod 18 mounted on table 17 as shown.

In accordance with the invention, the downward inclination of guide means 11 as well as of cladding tube 14 which is interconnected therewith should be sufficient to cause a pellet 9 which is pushed over break point 22 to slide downwardly in groove 12 and into tube 14 under the influence of gravity. Guiding means 11, beyond break point 22, may be inclined at an angle of from 15° to 60° relative to a horizontal plane and it has been found that an inclination in the order of about 45° is most suitable. It can be seen from the drawings that supporting member 16, piston rod 18 and lower guiding portion 15c of connector 13 provide means for positioning cladding tube 14 at the lower end of guide means 11 in longitudinal alignment therewith and in a position for receiving pellets 9 through open end 14a as the pellets 9 slide under the influence of gravity along groove 12.

In operation, plate 7 is positioned such that a string of pellets 9 thereon is aligned with groove 10 and therefore with groove 12 and cladding tube 14. An operating cylinder 20 with a piston rod 21 is provided to axially displace the string of pellets 9 along the axis of groove 10 and toward break point 22. Cylinder 20 and piston rod 21 therefore provide means for displacing pellets 9 along the axis of groove 10 and over the break point 22 whereupon each pellet 9 will be free to slide down guide means 11 and into cladding tube 14.

Figure 3:
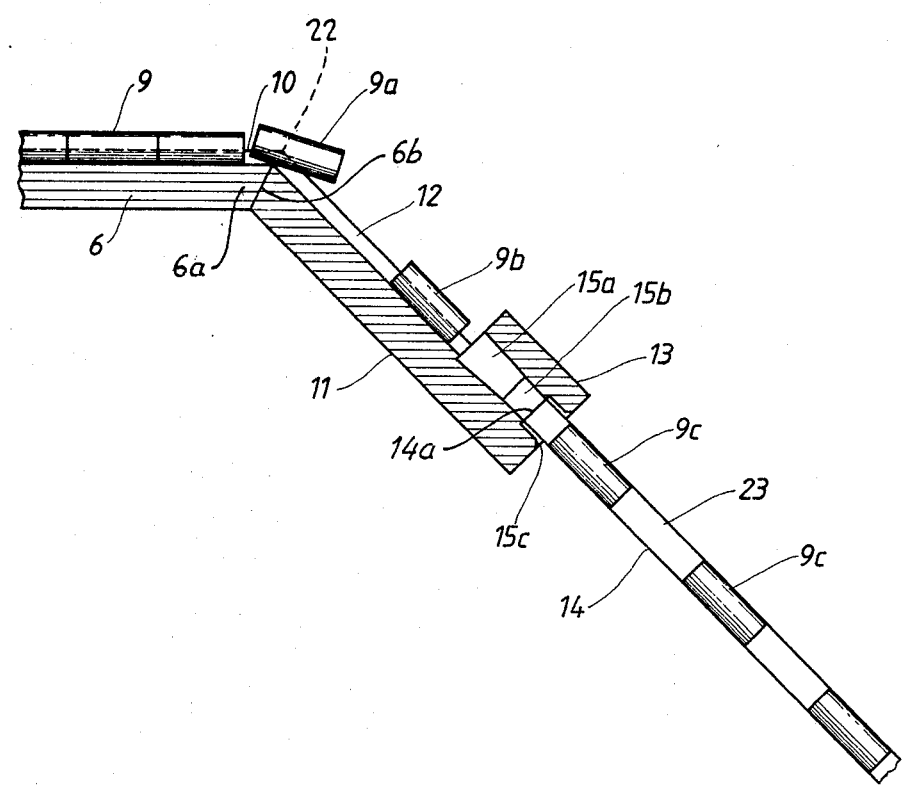
FIG. 3 is an enlarged view, partially in cross-section, illustrating specific aspects of the apparatus of FIG. 1.

As each pellet 9 is moved sufficiently far along groove 10 such that its center of gravity passes break point 22, the pellet will become tilted into alignment with groove 12 of guide means 11. As can be seen viewing FIG. 3, pellet 9b which has previously passed break point 22 is moving along groove 12 while pellets 9c and 9d which have previously passed break point 22 are moving inside cladding tube 14. As is also illustrated in FIG. 3, pellet 9a is undergoing the tilting process at break point 22 whereby the same will beome aligned with cladding tube 14. The distance between the pellets depends upon the rate which the string of pellets is fed toward break point 22 by piston rod 21. Thus, piston 20 and piston rod 21 provide means for displacing the pellets at a rate such that the latter are longitudinally spaced from one another as they slide toward and into cladding tube 14. The sliding speed in cladding tube 14 is dependent upon friction, the inclination of the tube and the clearance between each pellet and the inner wall of the tube. In this latter regard it should be noted that the air below each pellet must pass such clearance as the pellet approaches the lower end of cladding tube 14. Thus, an air cushion 23 is provided between pellets 9c and 9d, for example, to prevent these pellets from contacting one another prior to the time that the lowermost pellet 9d reaches the bottom of the tube or the upper end of a pellet which has previously been inserted into the cladding tube 14. It is this individual feeding of the pellet that has been found to be extremely advantageous and that has eliminated problems with jamming, etc.

As can particularly be seen from FIG. 2, plate 7, because of its multiplicity of parallel grooves 8, presents means for arranging a number of strings of pellets 9 in end-to-end relationship. Each such string of pellets is disposed along an axis which is parallel to the axis of the string of pellets aligned with groove 10. Plate 7 is also adapted for movement laterally of table 4 whereby it is capable of moving the additional strings of pellets laterally across table 4 and into alignment with the axis of groove 10 where the individual pellets may be displaced by cylinder 20 and piston rod 21 for introduction into a cladding tube 14.

Although the drawings illustrate an apparatus in which only a single cladding tube 14 is undergoing filling with pellets, it will be readily understood by those skilled in the art to which the present invention pertains that the apparatus suitably might be constructed to include means for simultaneously filling a plurality of cladding tubes.

With reference to the apparatus of the invention, because of the provision of the well defined break point 22 at the transition between horizontal groove 10 and sloping groove 12, each pellet 9 tilts downwardly when its center of gravity passes break point 22. The string of pellets thus becomes discontinuous and the pellets will slide individually, at a predetermined distance from one another, along sloping groove 12 and into the open end 14a of cladding tube 14. The pellets will also continue to move downwardly in cladding tube 14 until contact is made with the bottom of the tube or with the upper surface of a pellet which has previously been inserted into the tube 14. Of course each tube 14 is suitably sealed at its lower end so that the pellets will be appropriately contained.

In its broadest aspect, the apparatus of the present invention which is also useful for carrying out the method of the invention comprises a substantially horizontal table 4 provided with at least one groove 10 for handling a string of fuel pellets 9. The apparatus of the invention also comprises at least one sloping guiding groove 11 which together with groove 10 presents a well defined break point 22. Moreover, the invention contemplates the provision of means for connecting a sloping cladding tube 14 to the sloping guiding groove 11 and a feeding device for axially displacing a string of pellets so that the same are pushed past break point 22 and can thereafter freely slide on sloping groove 11 and into cladding tube 14.

I claim:

1. A method for manufacturing nuclear fuel rods by introducing elongated fuel pellets into cladding tubes, each having an open end, said method comprising:
    positioning a support means having an edge in a horizontal orientation;
    arranging a plurality of said pellets in end-to-end relationship along a horizontal axis extending toward said edge on said support;
    providing an elongated downwardly inclined guide means disposed with its upper end in direct contact with said edge at said axis whereby said support means and said guide means together present a break point at their junction, the downward inclination of said guide means being sufficient to cause a pellet placed longitudinally thereon to slide therealong under the influence of gravity;
    positioning a cladding tube at the lower end of said guide means in longitudinal alignment therewith and in a position for receiving sliding pellets thereinto through said open end; and
    displacing said pellets along said axis and over said break point whereupon each pellet will individually slide down said guide means and into the cladding tube, said displacing being accomplished at a rate such that the pellets are longitudinally spaced from one another as they slide toward and into the cladding tube.

2. A method as set forth in claim 1 wherein is included the step of replacing each cladding tube with another cladding tube to be filled whenever the former becomes properly loaded with a predetermined number of said pellets.

3. A method as set forth in claim 2 wherein are included the steps of arranging additional pellets in end-to-end relationship along a second horizontal axis disposed in parallel relationship to said first mentioned axis on said support; moving said additional pellets laterally until the same are disposed along said first mentioned axis after said plurality of pellets have all been displaced over said break point; and displacing said additional pellets in the same manner as said plurality of pellets were displaced.

4. A method as set forth in claim 3 wherein are included the steps of providing further arrangements of additional pellets disposed along additional axis positioned in parallelism to said first mentioned axis; moving said further arrangements laterally in seriatim into a position along said first mentioned axis whenever the pellets of a prior arrangement have been displaced over said break point; and displacing the pellets of each further arrangement in the same manner as said plurality of pellets were displaced.

5. A method as set forth in claim 1 wherein said guiding means is disposed at an angle of from 15° to 60° relative to a horizontal plane.

6. An apparatus for manufacturing nuclear fuel rods by introducing elongated fuel pellets into cladding tubes, each having an open end, said apparatus comprising:
    support means having an edge;
    means for supporting said support means so as to be horizontally disposed;
    means for arranging a plurality of said pellets in end-to-end relationship along a horizontal axis extending toward said edge on said support means;
    an elongated downwardly inclined guide means,
    means for mounting said guide means so that it will be disposed with its upper end in direct contact with said edge at said axis whereby said support means and said guide means together present a break point at their junction, the downward inclination of said guide means being sufficient to cause a pellet placed longitudinally thereon to slide therealong under the influence of gravity;
    means for positioning a cladding tube at the lower end of said guide means in longitudinal alignment therewith in a position for receiving sliding pellets thereinto through said open end; and
    means for displacing said pellets along said axis and over said break point whereupon each pellet will slide down said guide means and into the cladding tube, said means being operative for displacing the pellets at a rate such that the latter are longitudinally spaced from one another as they slide toward and into the cladding tube.

7. An apparatus as set forth in claim 6 wherein said arranging means includes means for arranging additional pellets in end-to-end relationship along a second horizontal axis disposed in parallel relationship to said first mentioned axis on said support, said arranging means being adapted for moving said additional pellets laterally until the same are disposed along said first mentioned axis after said plurality of pellets have all been displaced over said break point.

8. An apparatus as set forth in claim 7 wherein said arranging means includes structure for facilitating further arrangements of additional pellets disposed along additional axes positioned in parallelism to said first mentioned axis, said arranging means being adapted for also moving said further arrangements laterally in seriatim into a position along said first mentioned axis whenever the pellets of a prior arrangement have been displaced over said break point.

9. An apparatus as set forth in claim 6 wherein said guiding means is mounted so as to be disposed at an angle of from 15° to 60° relative to a horizontal plane.

10. An apparatus as set forth in claim 7 wherein said arranging means comprises a plate mounted on said support for movement in said lateral direction, said plate being provided with a plurality of pellet receiving grooves extending in a direction parallel to said axes.

11. An apparatus as set forth in claim 8 wherein said arranging means comprises a plate mounted on said support for movement in said lateral direction, said plate being provided with a plurality of pellet receiving grooves extending in a direction parallel to said axes.

* * * * *

UNITED STATES PATENT OFFICE
CERTIFICATE OF CORRECTION

PATENT NO. : 4,243,078

DATED : January 6, 1981

INVENTOR(S) : Thorbjorn Sahlin

It is certified that error appears in the above-identified patent and that said Letters Patent are hereby corrected as shown below:

[73] Assignee: AB ASEA-ATOM, Vasteras, Sweden

Signed and Sealed this

Twenty-sixth Day of May 1981

[SEAL]

Attest:

RENE D. TEGTMEYER

*Attesting Officer*  *Acting Commissioner of Patents and Trademarks*